United States Patent [19]

Ladany

[11] 4,149,929
[45] Apr. 17, 1979

[54] STRIPPING OF PROTECTIVE COATINGS FROM GLASS FIBERS

[75] Inventor: Ivan Ladany, Stockton, N.J.

[73] Assignee: RCA Corporation, New York, N.Y.

[21] Appl. No.: 915,799

[22] Filed: Jun. 15, 1978

[51] Int. Cl.² ............................................. B29C 17/08
[52] U.S. Cl. .................................. 156/668; 156/655; 252/79.2
[58] Field of Search .............. 252/79.2; 156/654, 655, 156/657, 663, 668, 155, 344; 134/3; 427/336, 337; 350/96

[56] References Cited

U.S. PATENT DOCUMENTS

| 3,871,935 | 3/1975 | Gloge et al. | 156/654 X |
| 4,090,777 | 5/1978 | Wittke | 350/96.15 |
| 4,118,270 | 10/1978 | Pan et al. | 156/654 X |

*Primary Examiner*—William A. Powell
*Attorney, Agent, or Firm*—H. Christoffersen; Birgit E. Morris; Allen Bloom

[57] ABSTRACT

A method of removing the protective polymeric layers of an optical fiber comprises contacting the fiber with a mixture of sulphuric acid and hydrogen peroxide to remove the outer protective coating followed by contacting the remaining protective coating with concentrated sulphuric acid.

4 Claims, 3 Drawing Figures

STRIPPING OF PROTECTIVE COATINGS FROM GLASS FIBERS

The Government has rights to this invention pursuant to Contract No. N00173-77C-0136 issued by the Department of the Navy.

This invention relates to a method for stripping an optical fiber. More particularly, this invention relates to a method for chemically stripping the outer polymeric protective layers of an optical fiber.

BACKGROUND OF THE INVENTION

Optical communications offer another means, in addition to the more traditional broadcast and electrical methods, of transmitting information. In optical communications a light beam from a laser or light emitting diode is modulated and transmitted along an optical fiber between sending and receiving points. It is important that the light travel along the optical fiber and not be lost by transmission through the walls. Therefore, commercially available optical fibers comprise a glass fiber core and a surrounding cladding, each having differences in refractive index such that the light is retained within the optical fiber. Fused silica and other glasses are often employed as the host materials both for the core and the cladding. Fibers employing these materials are thin, fragile and difficult to handle. As a result, the cladding is covered with protective polymeric layers to increase handleability and prevent unwanted fracturing of the optical fiber. In some optical fibers the cladding is surrounded by a polysiloxane layer which in turn is coated with a layer of a polyester such a polyethylene terephthalate.

When the optical fiber is connected to a light source or is to be coupled to another fiber, the protective polymeric layers must be removed. The traditional method of mechanically stripping the outer polymeric layers is unsatisfactory because it requires special skill, leads to breakage of the fiber and is, in addition, time consuming. The use of organic solvents to strip the polymeric layers leads to environmental, health and flammability problems. It would therefore be desirable to develop a method of chemically removing the protective layers without damaging the inner core and cladding which avoids the use of organic solvents. More than one reagent may be required to chemically strip the layers when the protective layers are made of different polymeric materials having different chemical properties.

SUMMARY OF THE INVENTION

I have found a method of removing the protective polymeric layers of an optical fiber without adversely affecting the clad fiber comprising removing the outer polyester coating by contacting it with a solution of concentrated sulphuric acid and hydrogen peroxide. The inner polysiloxane layer is then removed by contacting it with a solution of concentrated sulphuric acid. The outer protective layer loses its integrity and can be readily removed and the inner layer decomposes.

DETAILED DESCRIPTION OF THE INVENTION

Commerically available optical fibers have an outer protective coating layer of a polyester and an inner protective coating layer of a polysiloxane. The polyester layer, which may be a copolymer containing terephthalate units, is dissolved by contacting it with a solution of sulphuric acid and hydrogen peroxide. A mixture consisting of two parts by volume of concentrated sulphuric acid and one part by volume of 30 percent hydrogen peroxide has been found to be effective. When the sulphuric acid is added to the hydrogen peroxide, an exothermic reaction occurs. The portion of the fiber to be stripped is placed in this warm solution. If no additional heat is applied, the polyester coating loses its integrity after 1½ to 2 hours. By maintaining the temperature of the solution at about 50° C. the outer fiber covering can be readily removed after 20-25 minutes.

After removing the fiber from the sulphuric acid-hydrogen peroxide solution, the fiber is rinsed under cold tap water. The outer polyester coating is now no longer a coherent layer and it is easily removed by gentle wiping with a piece of tissue paper. The inner polysiloxane protective coating remains intact.

The fiber is next contacted with concentrated sulphuric acid at room temperature. In 10-20 minutes the inner polysiloxane coating has dissolved. The fiber is removed fromthe acid and rinsed by holding it in a gentle stream of cold tap water. The resulting stripped fiber is then ready for further manipulations such as attachment to a solid-state laser.

This invention may be further illustrated by means of the drawings.

Figure 1:
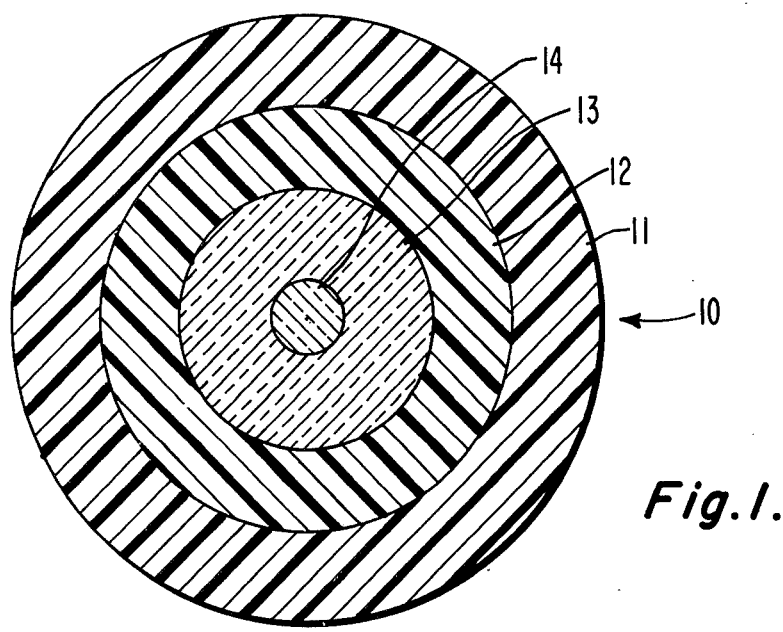
FIG. 1 is a cross-sectional view of an optical fiber with two protective polymeric coatings.

FIG. 1 shows the optical fiber 10 prior to stripping. The optical fiber 10 consists of inner glass core 14 having a diameter of about 4-4.5 micrometers surrounded by a glass cladding 13 having an outer diameter of about 3-4 mils (76-92 micrometers). The refractive indices of the core 14 and cladding 13 are such that the refractive index differences cause the light to remain inside the optical fiber and travel along its long axis. The cladding is surrounded by an inner protective coating 12 having an outer diameter of about 9-10 mils (229-254 micrometers) which may consist of a polysiloxane or the like. The inner protective layer 12 in turn is surrounded by an outer protective layer 11 having an outer diameter of 15-20 mils (380-510 micrometers) which may be made of a suitable polymeric material such as a polyester, for example, polyethylene terephthalate.

Figure 2:
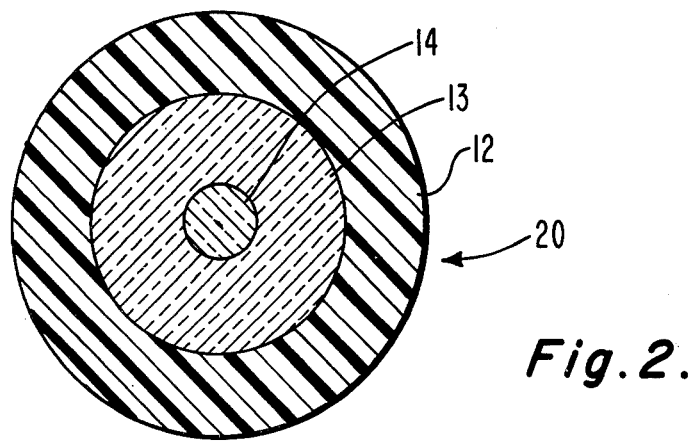
FIG. 2 is a cross-sectional view of an optical fiber after the outer polymeric coating has been removed.

FIG. 2 shows the optical fiber 20 after the outer protective layer 11 has been removed. The inner core 14 is still surrounded by the cladding 13 which in turn is covered by an inner protective coating 12.

Figure 3:
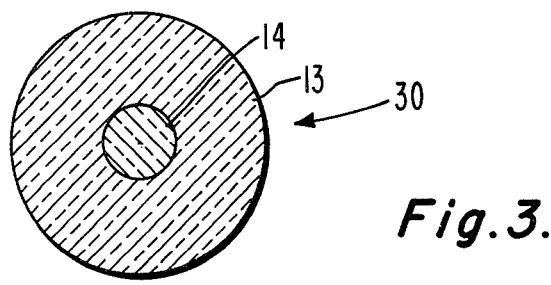
FIG. 3 is a cross-sectional view of an optical fiber after both the protective coatings have been removed.

FIG. 3 shows the optical fiber 30 afer both the protective layers have been removed. The core 14 is now surrounded by the cladding 13. The protective layers have been removed.

The invention will be further illustrated by the following Example but the invention is not meant to be limited to the details described therein.

EXAMPLE

An optical fiber 10, as shown in FIG. 1, having an outer diameter of 18 mils (457 micrometers) was contacted with a mixture of two parts by volume of concentrated sulphuric acid to one part by volume of 30 percent hydrogen peroxide. The mixture was prepared by pouring sulphuric acid into the hydrogen peroxide. The mixing process is strongly exothermic and the fiber portion to be stripped was immersed in the hot solution. The mixture and the portion of the optical fiber to be stripped were placed on a hot plate in order to keep the temperature near 50° C. After about 20-25 minutes the fiber was removed and rinsed under cold tap water. The polyethylene terephthalate polyester outer protective coating 11 crumbled readily and was removed by gentle wiping with a piece of tissue paper. The optical fiber 20 was next placed in concentrated sulphuric acid at room temperature. In about 10-20 minutes the inner polysiloxane coating 12 dissolved leaving the fiber 30 which consists of an inner core 14 and outer cladding 13. After removal from the acid the fiber was rinsed by holding in a gentle stream of cold tap water.

COMPARATIVE EXAMPLE A

An optical fiber 10, as shown in FIG. 1, was placed in concentrated sulphuric acid at room temperature. After 10-20 minutes the outer polyethylene terephthalate protective layer was unchanged and had neither dissolved nor lost its integrity.

COMPARATVE EXAMPLE B

An optical fiber 20, as shown in FIG. 2, was placed in a sulphuric acid-hydrogen peroxide mixture as used in the Example. After 20-25 minutes at 50° C. the fiber was removed and rinsed under cold tap water. The polysiloxane protective coating had neither dissolved nor lost its integrity.

I claim:

1. A method for stripping the protective polymeric coatings from an optical fiber consisting of a glass fiber core, a glass cladding layer surrounding said core, an inner protective coating of a polysiloxane surrounding said cladding layer and an outer protective coating of a polyester, comprising
   (a) contacting the said optical fiber with a mixture of sulphuric acid and hydrogen peroxide for a time sufficient to destroy the integrity of said outer coating; and
   (b) contacting said inner coating with concentrated sulphuric acid for a time sufficient to dissolve said inner coating.

2. The method of claim 1 wherein said outer protective coating is polyethylene terephthalate.

3. The method of claim 1 wherein said mixture comprises two parts by volume of concentrated sulphuric acid and one part by volume of 30 percent by weight of hydrogen peroxide.

4. The method of claim 1 wherein said outer coating is contacted with said mixture at 50° C.

* * * * *